June 30, 1925.
C. F. JENKINS
TRANSMITTING PICTURES BY WIRELESS
Filed March 13, 1922
1,544,156
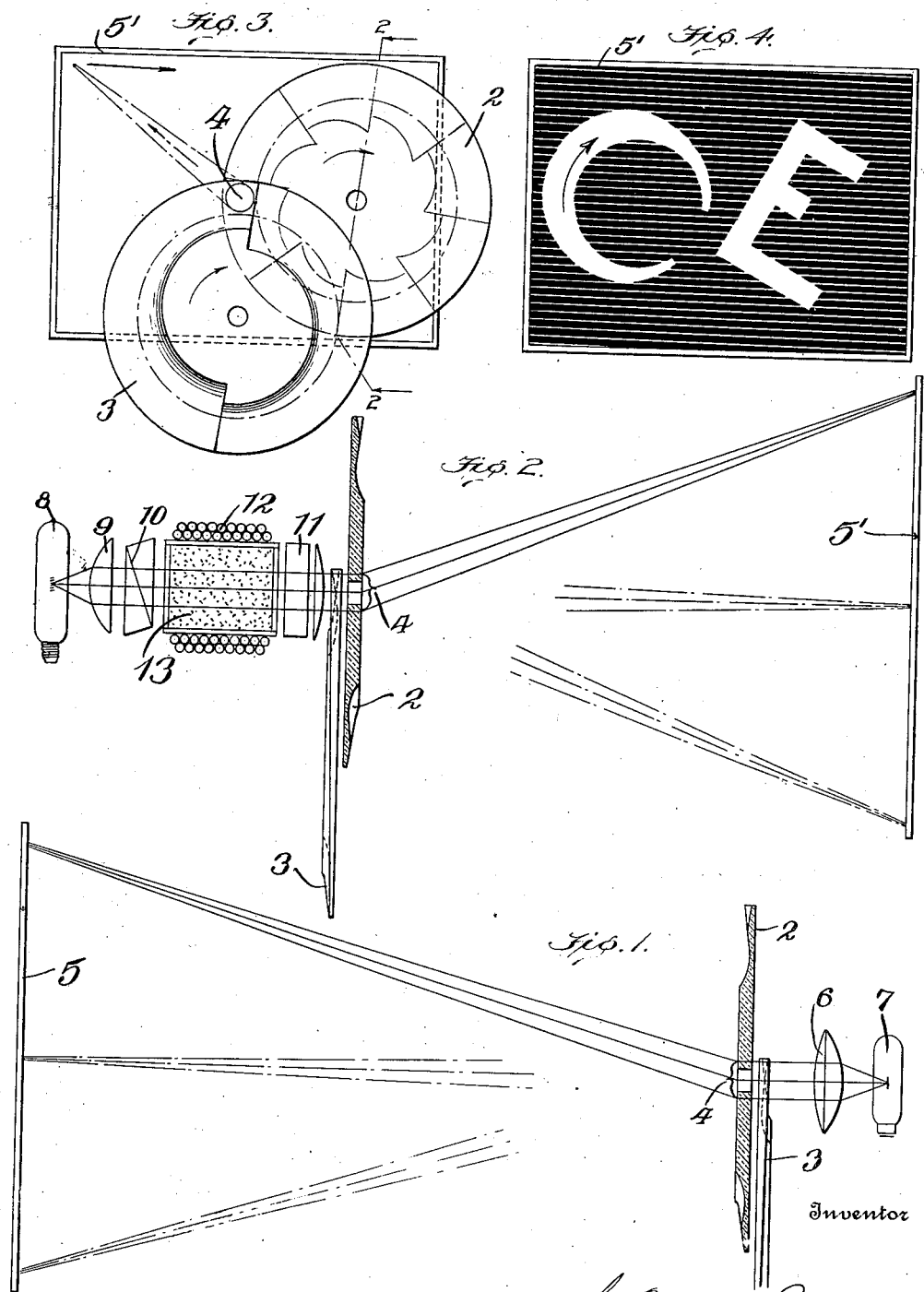

Patented June 30, 1925.

1,544,156

UNITED STATES PATENT OFFICE.

CHARLES FRANCIS JENKINS, OF WASHINGTON, DISTRICT OF COLUMBIA.

TRANSMITTING PICTURES BY WIRELESS.

Application filed March 13, 1922. Serial No. 543,331.

*To all whom it may concern:*

Be it known that I, CHARLES FRANCIS JENKINS, a citizen of the United States, and resident of Washington, in the District of Columbia, have invented certain new and useful Improvements in Transmitting Pictures by Wireless, of which the following is a specification, reference being had therein to the accompanying drawing.

This invention pertains to transmitting pictures by wireless electrical agency, which, so far as I am aware, is broadly new. It is common to impress upon wireless waves sound characteristics and then to send those waves from a selected station, and to receive them by means of suitable apparatus at any desired place or places within the effective range of the instruments employed and translate them into precisely the characteristic producing agent, thereby reproducing speech or other sounds at as many distant points as may be desired, this operation being commonly termed " broad-casting."

In a somewhat analogous yet different way, characteristics pertaining to a picture, or an object not a picture, moving or otherwise, may, by means of this invention, be impressed upon wireless waves and at a distant place or places be translated into a fac simile reproduction of the original subject. Practically, it is thought, such broadcasting of pictures may be produced in different ways but was not possible by any means known prior to the invention of a glass, prism-like structure in which the angle between the faces is variable, as disclosed in Patent Number 1,385,325, where is shown an annular prismatic body which in rotation causes a transmitted ray or pencil of light to be progressively deflected so that it sweeps laterally through a certain angle. If two such prisms overlap in such manner that a light ray may pass through both, while the two ring diameters passing through the point of incidence of the ray are perpendicular to each other, one of the rings would tend to bend the ray in a plane, while the other would tend to bend it in a second plane at right angles to the first. The result of the two simultaneous deflections would be to cause the ray to trace a diagonal path on a screen or the like. Obviously, one of the prism rings may have more prism segments than the other, and one may rotate faster than the other. If the arrangement be such that the total bending of the ray by a segment of one prism ring occurs while the bending by the other is comparatively slight, the path of the ray on a screen would be but slightly inclined and the instant said total bending is completed, the operation begins again but with the slow lateral deflection by the second prism continued so that a second parallel path would be traced on the screen, and so on.

In the accompanying drawings, which are diagrammatic,

Fig. 1 discloses the transmitting devices, seen in plan, with one of the ring prisms in diametrical section and forming the peripheral portion of a glass plate.

Fig. 2 shows similarly the receiving devices.

Fig. 3 is a face view of the ring prism plates and a screen beyond.

Fig. 4 is a face view of that portion of a screen upon which the picture is produced, black bars and white lines being used to indicate the paths of a light pencil over this area.

In the transmitting set, of Figs. 1 and 3, 2 and 3 represent the over-lapped disks, 4 the place where the light pencil passes through both rings,—it being behind the disk's central opening when seen as in Fig. 1. 5 designates a screen bearing, for example, a picture to be reproduced, 6 is a lens, and 7 a suitable form of photo electric cell (many forms being known) upon the light, sensitive element of which the lens directs the light coming through the rings at 4. The disk 2 is shown as having eight prism segments while the disk 3 has but two segments. The disk 2 is the one which deflects, or tends to deflect, the light horizontally, and as each segment passes the working point 4 it receives light successively from a series of points beginning on one side of the picture and extending to the opposite side, the amount of light varying with the variation from white to black in the picture. The light so received always falls at substantially the same point on the cell, since the ray, or pencil, is deflected in accordance with the variation in thickness of the prism. While the disk 2 alone would deflect the light in a plane, the disk 3 would deflect it transversely to that plane, the resultant of the two deflections being uniform or constant in direction and always falling on the cell as stated. Such cells cause an electric current to fluctuate as the light varies in intensity, this being well known and needing no discussion here.

In the receiving apparatus, there are prisms 2, 3 like those of the transmitting apparatus and identical in arrangement, and here 5' indicates a screen upon which a duplicate of the picture on the screen, or the like, 5, Fig. 1 is to be reproduced. 8 represents a source of light, 9 a lens for making parallel certain rays from that source, 10 a Nicol prism polarizer, 11 an analyzer, 12 an electric coil surrounding a space 13 in which may be a cell filled with bisulphide of carbon. This apparatus between the light 8 and the ring disks 2, 3 is selected to illustrate any possible devices whereby a fluctuating electric current may cause the amount of light passing to vary correspondingly, or control automatically the intensity of light passing from the source to the screen. In the use of the members 10, 11 they are so set as to cut off all light, normally, but in passing through the magnetic field of the coil 12 the plane of polarization of the rays from 10 is rotated proportionally to the strength of the current. If this current be the fluctuating current from the transmission set (as I make it), the light passing from the source 8 to the screen 5' will be varied, accordingly, between full transmission and entire extinction. The presence of bisulphide of carbon seems to facilitate the rotation of the plane of polarization. If the prism disks 2, 3 be so adjusted that initially any light passing the light-controlling devices impinges upon the upper left hand portion of the screen 5' of Fig. 4 such light repeatedly travels from left to right across the screen, as this disk rotates changing the deflection, of course, as the thickness of the prism segment changes, and if at the same time the disk 3 tends to deflect the beam in a plane perpendicular to the plane of normal deflection by the disk 2, the pencil of light will sweep over the disk from left to right in a slightly diagonal direction. As each prism segment of the disk 2 completes carrying the pencil of light from left to right the next segment repeats the action, but with the path of the light slightly displaced owing to the deflection by the disk 3, the successive paths of the ray being suggested by the parallel black bars of Fig. 4.

Were the light ray thrown on the screen by slow rotation of the disks, without being cut down or cut off, the eye would see bands of light produced in succession where black bars are shown, and at very high disk speeds persistence of vision holds the upper line of light until after the lower line is upon the screen; or, in other words, the entire surface seems to be illuminated all the time. If the intensity of the pencil be controlled by the apparatus 9, 10, 11, 12, 13, the degree of illumination will vary on different parts of the screen and will be full on parts corresponding to white on parts of the screen 5 of the transmitting devices. If, for example, the screen 5 bears letters C E in white the light will at these letters pass undiminished to the cell 7 and the maximum current will pass through the coil 12, rotating the plane of polarization so that no light will be cut off, and these letters C E will appear in white upon the screen 5'— which may be in a distant city.

Obviously, any shade between white and black, in the picture upon the screen 5, will cause a proportionate modification of light upon the screen 5'. And it is not material to the operation that the picture upon the screen 5 is a motion picture, nor material whether the screen 5' be sensitized or be simply for viewing directly like the screen of projecting apparatus.

As any acceptable means for securing synchronous rotation of the sets of disks at the sending and receiving stations, respectively, may be used, no such means is here set forth. With such synchronism, the light upon the screen 5 will be duplicated in position and intensity upon the screen 5', or a picture upon the screen 5 will be duplicated on the distant screen 5'.

Under some conditions, the screen 5' may be phosphorescent or fluorescent, to make the picture smoother, to permit lower rotation speed, and to increase the persistence of the image necessarily resulting from persistence of vision; and, further, the light pencil may be colored.

The wireless wave propagation devices are not of my invention and well known apparatus may be used, preferably such as involves undampened waves.

At the receiving station, the fluctuating wireless waves may pass directly through the coil 12, or may first be modified in the usual way by means of the audion tube.

In order that the modulation of the wireless transmitting and receiving sets may have a slower rate, it is possible to have multiple units of this invention working on different parts of the same picture surface simultaneously.

What I claim is:

1. In light-controlling mechanisms, means for giving a ray of light a fixed direction from said means, and refracting means for giving it a different varying direction, in combination with an additional refracting means for simultaneously giving to the varying direction ray a direction approximately perpendicular to the first direction.

2. In light-controlling mechanisms, means for giving a ray of light a fixed direction from said means, and refracting means for giving it a different varying direction in combination with an additional refracting means for simultaneously giving to the movable direction of the ray a position approximately perpendicular to the first direction, the movement of the ray having a greater frequency in one direction than in the other.

3. In light-controlling mechanisms, means for giving a ray of light a fixed axis in one direction from said means, and a revolubly mounted refracting means adapted to vibrate the axis of said ray in another direction from said means, in combination with an additional refracting means for simultaneously giving to the movable axis of the ray a second direction approximately perpendicular to the first direction, the movement of the ray having a greater frequency in one direction than in the other, and with the rate of the slower exceeding ten vibrations per second.

4. In light-controlling mechanisms, a prism rotated in such manner that the axis of a ray of light passing therethrough will be given a lateral movement, in combination with a second prism so located and rotated that the said ray of light will also pass through said second prism and be given a movement in a plane approximately perpendicular to the plane of first movement of the light ray.

5. In light-controlling mechanisms, a prism having a changing angle between its working faces, in combination with a second like prism, the two prisms being so located and moved that the axis of a light ray passing therethrough will have a movement in two planes approximately perpendicular to each other.

6. In light-controlling mechanisms, means for giving a ray of light passing therethrough a fixed axis on one side of said means, and an axis movable in a lateral direction on the other side of said means in combination with an additional means for simultaneously giving to the movable axis of the ray a second direction approximately perpendicular to the first direction, the immovable axis of the ray of light terminating in a stationary point, the movable axis terminating in a surface in general perpendicular to an extension of the fixed axis of the ray of light every part of such surface being covered in succession in a frequency time interval, exceeding ten per second.

In testimony whereof I hereunto affix my signature.

CHARLES FRANCIS JENKINS.